United States Patent [19]

Johnson

[11] Patent Number: 4,626,100
[45] Date of Patent: Dec. 2, 1986

[54] WIDE FIELD OF VIEW TWO-AXIS LASER LOCATOR

[75] Inventor: John L. Johnson, Huntsville, Ala.

[73] Assignee: The United States of America as represented by the Secretary of the Army, Washington, D.C.

[21] Appl. No.: 565,788

[22] Filed: Dec. 27, 1983

[51] Int. Cl.[4] .......................... G01C 1/00; G01J 4/00
[52] U.S. Cl. ..................................... 356/152; 356/365
[58] Field of Search ............... 356/141, 152, 365, 367

[56] References Cited

U.S. PATENT DOCUMENTS

| | | | |
|---|---|---|---|
| 3,544,221 | 12/1970 | Putnam | 356/152 |
| 3,558,230 | 1/1971 | Fowler | 356/152 X |
| 3,601,613 | 8/1971 | Hock | 356/152 X |
| 3,623,814 | 11/1971 | Buhrer | 356/152 X |
| 3,657,547 | 4/1972 | Mansfield | 250/203 R |
| 3,858,201 | 12/1974 | Foster | 356/152 X |
| 4,072,281 | 2/1978 | Miller, Jr. et al. | 244/3.16 |
| 4,247,059 | 1/1981 | Duke et al. | 244/3.16 |

OTHER PUBLICATIONS

M. Francon, "Optical Interferometry", Academic, New York, 1966, pp. 137–141.
T. H. Peek, "Use of Savart Plates in Grating Interferometers", Applied Optics, vol. 10, No. 5, May 1971, pp. 1092–1096.
T. H. Peek, "Generalization of Francon's Modification of the Savart Plate", Applied Optics, vol. 10, No. 10, Oct. 1971, pp. 2235–2239.
H. T. Braswell et al., Optical Angular Motion Sensor, Phase One, Final Report, Report #AD-A011 576, Chrysler Corporation Space Division, Apr. 30, 1975, pages (27 pages of interest selected from the 286 page report).
Optics Guide, published by Melles Griot, 1975, pp. 173–175.

Primary Examiner—Stephen C. Buczinski
Assistant Examiner—Linda J. Wallace
Attorney, Agent, or Firm—Freddie M. Bush; John C. Garvin, Jr.

[57] ABSTRACT

A remote laser locator system for viewing a wide field of view and detecting the angular position of a remote laser. A laser beam directed toward the sensor from any position within a 90 degree circular field-of-view can be detected to a positional accuracy of less than 0.1 degree in a two-axis coordinate system. The system utilizes an inline or coaxial optical sensor having field-of-view (FOV) optics that compress the field-of-view. The compressed output from the FOV optics is directed through a polarizer and filter to a phase shifter. The phase shifter, a pair of birefringent crystals, encodes the angle of incidence of the laser beam as a phase shift between the two components of the polarized input beam. Subsequently, an analyzer such as a Wollaston prism decomposes the beam into two linear component beams. These component beams are processed through a second phase shifter and an analyzer pair which are rotated axially with respect to the first pair to provide four distinct component beams. These components are condensed through a reimager lens and coupled to an array of intensity detectors. The array detector outputs are then combined to provide two normalized signal proportional to a trigonometric function of the two components of the angle of incidence of the laser beam, indicative of its position in space.

12 Claims, 9 Drawing Figures

WIDE FIELD OF VIEW TWO-AXIS LASER LOCATOR

DEDICATORY CLAUSE

The invention disclosed herein may be manufactured, used, and licensed by or for the Government for governmental purposes without the payment to me of any royalties thereon.

SUMMARY OF THE INVENTION

An optical locator system for determining the angular position of a remote laser beam anywhere within a 90 degree field of view to a positional accuracy better than 0.1 degrees in two axes. The locator comprises optical and electronic processing circuitry. A laser beam within the field of view of the locator system passes through the front end or receiving optics and is directed to a pair of birefringent encoding crystals. The birefringent crystals encode the horizontal component of the angle of incidence of the laser beam as a phase shift of polarized components on each polarization axis. Subsequently, the encoded components are split with a polarization analyzer to provide two separate linear component beams. These two component beams are then passed through another pair of birefringent encoding crystals which encode the vertical component of the angle of incidence and then through a second polarization analyzer to provide four separate component beams as outputs. These four beams of optical energy are each converted from optical energy to electrical energy by four corresponding detectors for measuring the relative intensities of each component. The four outputs of these detectors are differenced in pairs and divided by their sum to yield the normalized ratio indicative of the angular position of the laser beam source with respect to a normal to the surface of the sensors.

DESCRIPTION OF THE PREFERRED EMBODIMENT

Figure 1:
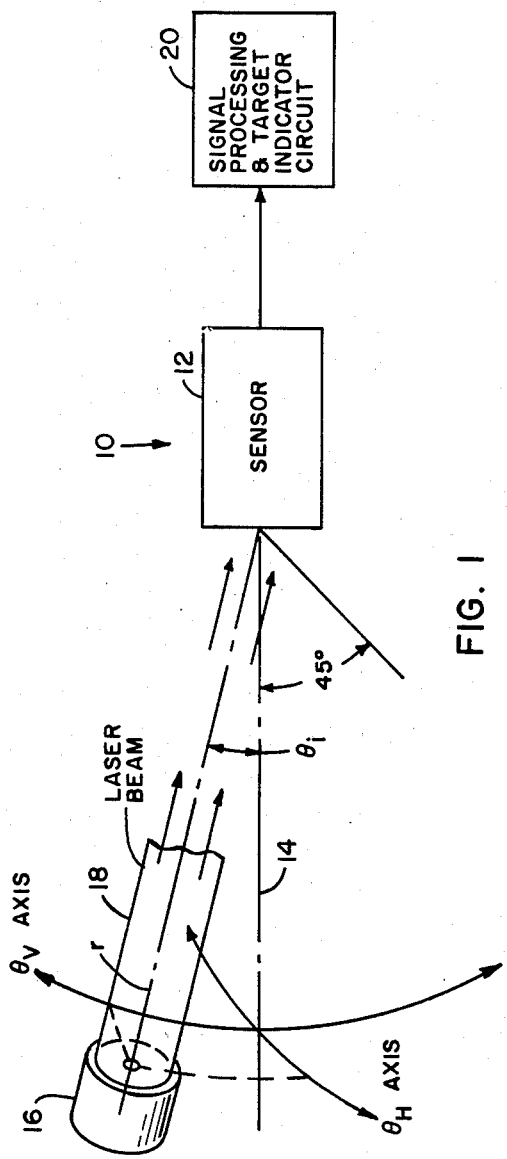
FIG. 1 is a perspective diagram of a wide field of view remote laser locator system with an impinging laser beam.

Referring now to the drawings wherein like numbers represent like parts, FIG. 1 discloses a preferred embodiment of the wide field of view remote laser locator system 10 wherein an optical sensor 12 is disposed for receiving a laser beam directed into the field-of-view of the sensor. Sensor 12 is disposed to subtend a solid angle of 90 degrees field-of-view having a central axis 14 normal to the optical input surface of the sensor. Axis 14 is considered as being a line normal to the surface projecting out into space around which a 45 degree angle of revolution can be made with another line also originating at the sensor head to define the 90° field-of-view. A laser source 16 spatially located remotely from the sensor directs laser beam 18 toward the sensor. If laser 16 lies within the field of view of the sensor, as defined by the 45 degree cone of revolution, the laser 16 may be considered as lying in a spherical segment capping the cone of revolution, and wherein each point of the segment is equidistant (r) from the center located at the sensor head. Laser 16 lies at an angle $\theta_i$ away from normal axis 14, where $\theta_i$ is $\leq 45$ degrees. Sensor 12 has electrical outputs which are coupled to signal processing and target indicator circuitry 20 for combining the respective signals and thereby indicating the horizontal and vertical components of the incidence angle $\theta_i$ at which laser beam 18 is impinging on the sensor system 10.

Figure 2:
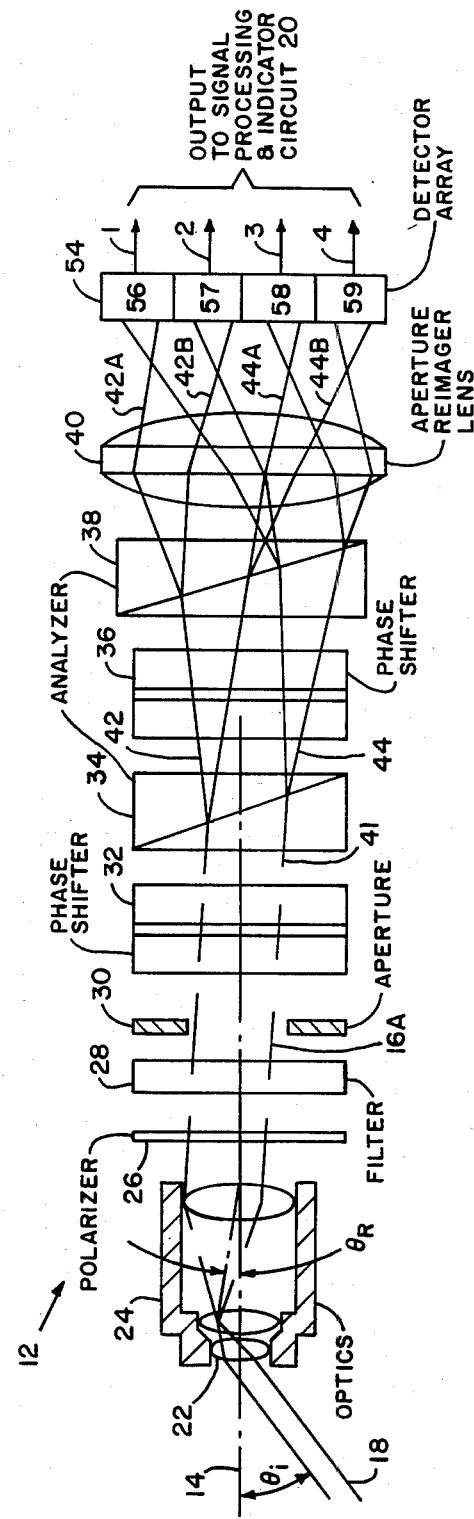
FIG. 2 is a schematic diagram showing typical optical paths through the optical sensor of the system.
Figure 3:
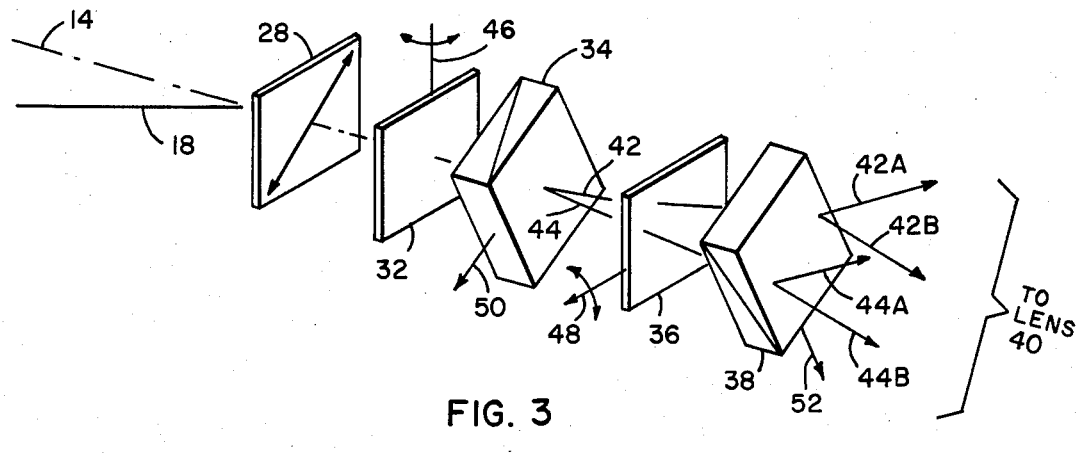
FIG. 3 is a partial single-line diagram showing the optical paths through the sensor.

FIG. 2 discloses the particular components and arrangement for processing the laser beam through sensor 12. Laser beam 18 impinges on the input lens 22 of field-of-view optics 24. Optics 24 compress the field-of-view and direct the laser beam through a polarizer 26 to a spectral line filter 28 which selects the particular wavelength or wavelengths that are to be passed. Optics 24 compress the horizontal and vertical components of the angle of incidence $\theta_i$ of the laser beam by a constant, R, which is the field-of-view reduction factor of optics 24, and is fixed by the particular choice of front end optics 24. Thus, an angle of incidence $\theta_R$ seen by subsequent components is related to $\theta_i$ by the equation $\sin \theta_R = R \sin \theta_i$. When the laser light 18 is the same wavelength as the single filter 28 the polarized wavelength of laser energy is coupled through filter 28, and through an internal aperture 30 to a phase shifter 32. The output beam 41 of phase shifter 32 is then coupled to an analyzer 34 which divides the beam into two linearly polarized components 42 and 44 which are respectively polarized parallel and normal to the polarization of input beam 18. The relative intensities of these two beams contain the angular information identifying the laser beam 18 direction with respect to the horizontal axis. The two beam components 42 and 44 are coupled to a second phase shifter 36. The output of phase shifter 36 is then directed to a second analyzer 38 which divides the two beams 42 and 44 into four beams 42A, 42B, and 44A, 44B respectively. For two-axis identification of the direction $\theta_i$ of laser source 16, phase shifter 36 and analyzer 38 are located as a unit with their sensitive axis positioned normal to that of phase shifter 32 and analyzer 34. This particular structure is shown in the partial single line diagram of FIG. 3. Thus, for an in-line or coaxial positioning of the optical components along axis 14, phase shifter 32 has a sensitive axis 46 shown perpendicular to and intersecting axis 14, and phase shifter 36 has a sensitive axis 48 perpendicular to and intersecting axis 14 and rotated around axis 14 by 90° with respect to axis 46. Thus the polarizations of beams 42 and 48 enter phase shifter 36 at the correct orientation, which is either parallel or normal to that of the input polarizer 26. Similarly, sensitive axis 50 of analyzer 34 is rotated around axis 14 by 90° with respect to axis 52 of analyzer 38. Analyzer 38 is oriented to split beams 42 and 44 apart in a direction perpendicular to the action of the first analyzer, yielding the four output beams 42A, 42B, 44A, and 44B. These output beam components are directed to a reimaging lens 40. Lens 40 is an aperture reimaging lens for imaging aperture 30 and directs the component beams to detector array 54. Reimaging the internal aperture 30 provides a more uniform and full illumination of the detectors of array 54 and thus eliminates any problem due to responsivity variations across the surface of each detector. Array 54 comprises detectors 56, 57, 58, and 59 arranged in four quadrants for receiving the beams 42A, 42B and 44A, 44B. The detectors convert the amplitudes of the impinging optical waves into electrical voltages which, when differentially combined, identify or define the precise source of laser energy 18. These electrical voltage outputs are coupled to the signal processing and target indicator circuitry 20 where they are combined to provide sum and difference signals indicative of the direction from which the original impinging light beam 18 is coming.

Figure 4:
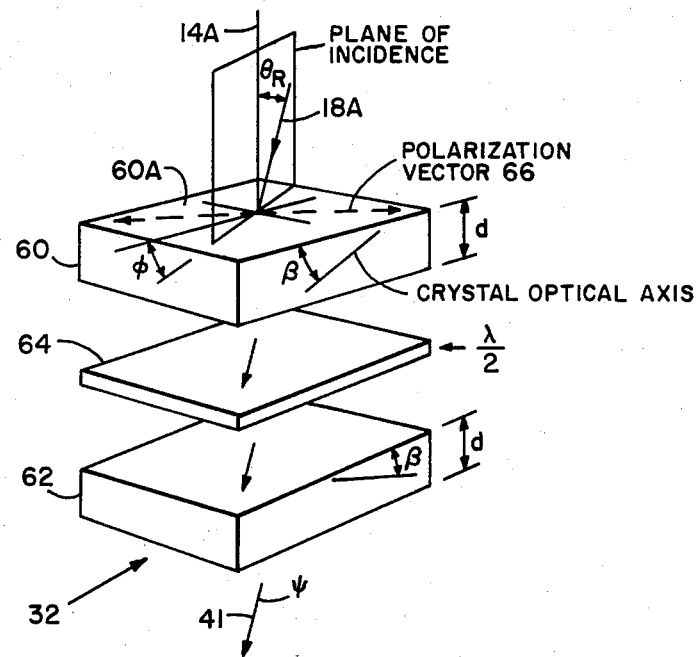
FIG. 4 is a diagram of the phase shifters of FIGS. 2 and 3.

Phase shifters 32 and 36 are Savart plates that encode the angle of incidence as a phase shift between two components of a polarized input beam. Operation of the Savart plate, phase shifters 32 and 36, are shown in FIG. 4. FIG. 4 discloses a modified Savart plate similar to that taught by M. Francon in the text "Optical Interferometry", 1966, Chapter 7; and as also discussed by T. H. Peek in Applied Optics Volume 10, No. 10, October 1971, beginning at page 2235. These references teach birefringent crystals cut with the optical axis at an angle to the surface. In FIG. 4 the birefringent crystals 60 and 62 have the same thickness d and are both cut with their optical axes at an angle $\beta$ to the surface. Plate 62 is rotated 180 degrees around axis 14A from plate 60. A half-wave ($\lambda/2$) retarder plate 64 is disposed between the two crystals and the stack is cemented together. A ray 18A passing through filter 28, with its linear polarization vector 66 at 45 degrees to the principal section, enters crystal 60 at an incident angle $\theta_R$ to the normal 14A to crystal surface 60A. Normal 14A and ray 18A define a common plane of incidence normal to the surface 60A of the crystal. When the ray 18A enters crystal 60 it is divided into ordinary and extraordinary rays (o-ray and e-ray) traveling different paths through the crystal. The polarizations of these rays are interchanged by the $\lambda/2$ plate and are further refracted by crystal 62. They emerge as parallel, superimposed rays 41A and 41B (not shown), having a relative phase shift because they have traveled different paths through the plate.

The Savart plates function as a shearing interferometer which offsets one ray with respect to the other. The half-wave plate interchanges the polarization vector of each ray with respect to the plates. This causes the output rays to have very little shearing left in the beam, with the phase shift between the components (e-ray and o-ray) being the major effect. While the e-ray and o-ray are operated on separately by the components of the Savart plate, they are not sufficiently removed from one another to be separate beams. Thus, the output beam 41 is still a single beam having the components 41A and 41B with a phase shift therebetween. The degree of phase shift is a function of the angle of incidence $\theta_R$ of the input beam 18A. Thus, the Savart plate encodes the angle of incidence as a phase shift between the two components of the polarized input beam. The resultant beam 41 is elliptically polarized, and the amount of ellipticity depends upon the angle of incidence as shown diagrammatically in FIGS. 5 and 6. This elliptically polarized wave is analyzed in detail by Peek in the Applied Optics article set forth hereinabove, first paragraph, page 2238; in references 3 and 8 of the article, and from the equations 1, 2, and 4 therein. Peek discloses that this particular variation of the Savart plate has great linearity over a large field of view.

Following the modified Savart plate 32, the beam 41 is decomposed into the two separated linear components 42 and 44 by the Wollaston prism analyzer 34, and is directed to the second phase shifter 36 (a Savart plate). The sensitive axis of phase shifter 36 being rotated 90° with respect to phase shifter 32 allows the two beams 42 and 44 to be further processed in the manner noted hereinabove with respect to phase shifter 32, causing another relative phase shift to occur in each component beam. The analyzer 38, also rotated 90° with respect to analyzer 34, is also a Wollaston prism and further decomposes the two beams into four beams. Due to the rotated positioning of elements 36 and 38 with respect to elements 32 and 34 respectively, the four output beams now contain the angular laser position information in relative amplitudes that are readily reduced to identify the precise direction of the laser beam. Thus, the two beams 42 and 44 are split apart in a direction perpendicular to the action of the first prism 34, yielding beams 42A, 42B and 44A, 44B. These four component beams are then condensed by the aperture reimaging lens 40 and directed to the array 54 of intensity detectors. Outputs from the array 54 are then coupled to the signal processing circuitry where they are differenced and summed in pairs to give the desired signals for both axes.

Figure 6:
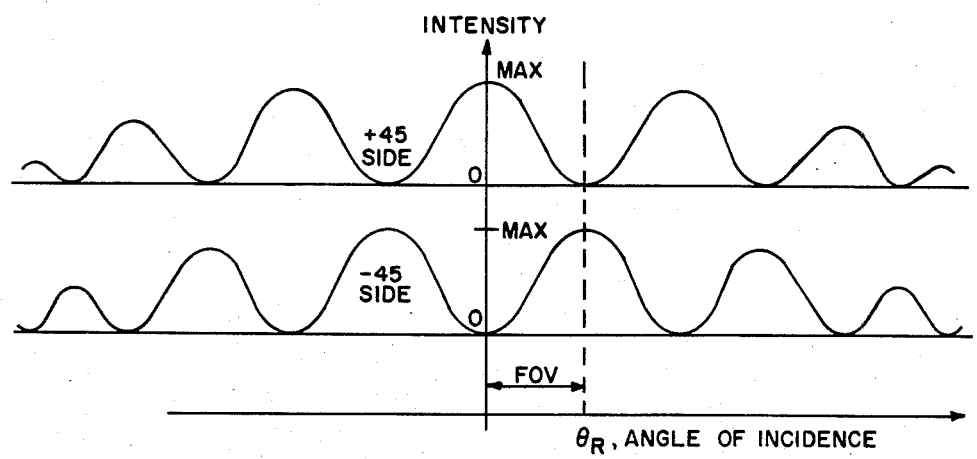
FIG. 6 shows typical analyzed output signals as encoded by the phase shifter.

By selecting Savart plate parameters so that the desired field of view covers one-half of one cycle, the entire range of angles is mapped into one unambiguous region of the output signals, as is shown in FIG. 6 and discussed hereinbelow.

The four outputs from sensor 12 are coupled to the signal processing and target indicator circuitry 20 for indicating the particular location of the laser beam source 16. Numerous circuits are well established for providing such signal processing and target indicating functions. Typical of such circuits is an oscilloscope for displaying the field-of-view on the screen and responsive to signal processing to indicate the sector of the quadrant in which the laser source is directing the beam from. U.S. Pat. No. 4,247,059 issued to J. R. Duke et al discloses typical signal processing circuitry in FIGS. 3 and 4 for providing vertical and horizontal position error signals and providing vertical guidance signals or correction signals indicative of coordinate positional changes as an output.

Similarly, U.S. Pat. No. 3,657,547 issued to G. R. Mansfield discloses signal processing circuitry which normalizes the input signal and provides the vertical and horizontal or pitch and yaw angular error. Normalizing is accomplished by dividing the vertical or horizontal difference signals by the sum of the total signal received to provide a measure of angular error of the optical energy source from the optical heading null axis. Normalizing the signal prevents residual signal fluctuation from affecting the angular position data. Miller, Jr. et al in U.S. Pat. No. 4,072,281 also discloses an optical attitude reference system and, as shown typically in FIGS. 8, 9, and 10, discloses o-ray and e-ray processing through sum and difference circuitry to obtain error signals indictative of the position of a remote target with respect to a tracking system. Any of these error or tracking systems can provide an electrical output indicative of an optical input which can be shown as coordinate or angular position indicating data on an oscilloscope. In view of the well established nature of such signal processing and target indicator circuitry, such circuitry is not disclosed in detail herein and is not considered germane to the subject invention.

Figure 7:
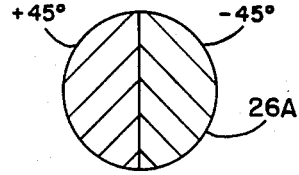
FIG. 7 is a diagram of a typical segmented polarizer.

The incoming laser beam is polarized by a fixed linear polarizer. Since the unit is a non-imaging device, a segmented polarizer can be used to assure that the correct polarization is obtained regardless of the polarization state of the original beam. As shown in FIG. 7, a typical segmented polarizer 26A comprises two half-circles of sheet polarizer cut so that one has its polarization vector at +45° and the other has its polarization vector at −45°, and the segments being placed adjacently to form a circular aperture.

The induced phase shift in Savart plates 32 and 36 between the e-ray and the o-ray which encodes $\theta_i$ in radians, is $$\psi = \frac{4\pi d}{\lambda}(n_o - n_e)\sin\theta_{R1}\sin\phi\sin 2\beta \quad (1)$$

where $\theta_{R1}$ = interior angle of incidence ≈ Arc sin $[(R/n)(\sin\theta_i)]$ (not shown)
$\lambda$ = wavelength of the spectral line filter,
d = thickness of each crystal of the Savart plate,
$\theta_i$ = angle of incidence of laser energy, variable,
$\phi$ = angle between plane of incidence and principal section of crystals in the Savart plate,
$\beta$ = crystal cut angle
R = field of view reduction factor
$n_o, n_e$ = indices of refraction of the uniaxial birefringent crystal.

The Wollaston prisms are set to divide each input beam into linear components parallel ($I_\parallel$) and normal ($I_\perp$) to the polarization of the input beam. The difference between the detected intensities of the output beams when divided by their sum is a normalized ratio $$I_n = \frac{I_\parallel - I_\perp}{I_\parallel + I_\perp} = \cos\psi. \quad (2)$$

By choosing $\phi = \pi/2$ (the most sensitive orientation of each Savart plate), shifting the $\Omega$ origin, and assuming identical responsivity and linearity of the detectors, the final signal can be written as $$S = \sin(2k\sin\theta_R) \quad (3)$$

where, to first order in $\Delta n$, $$k = \frac{2\pi d}{\lambda}\frac{\Delta n}{n_o}\sin 2\beta. \quad (4)$$

where $\Delta n = n_e - n_o$ and is typically less than 10% of $n_o$ for most crystal materials.

The $\Omega$ origin is shifted by 90° in phase. This is done by physically tilting the respective Savart plates around their sensitive axes by a bias tilt angle numerically equal to one-half the compressed field of view. The parameters $\Delta n$, $n_o$, d, $\lambda$, and $\beta$ are constrained to give $$k\sin\theta_{R\ max} = \pm\pi/4 \quad (5)$$

which provides the desired unambiguous signal output. Typical component specifications are:
Input Beam FOV: ±45°
Reducing Optics 24: 10 to 1
Polarizer 26: Polaroid HN-22, HN-32, KN-36 sheet polarizer (typical)
Plates 32 and 36:
  quartz, surface area: 2 cm×2 cm,
  Crystal cut: $\beta = 2°$,
  wavelength: 6328A,
  Crystal thickness: 1.75 mm for each plate
Prisms 34 and 38:
  calcite Area: 2 cm×2 cm,
  Output: 10° between output beams
Reimager Lens 40: 2 cm diameter, 0.8 cm focal length
Detectors 56,57,58,59:
  UDT PIN-Spot 4D having an Active Area: 0.05"×0.05",
  Four elements with 0.005" gap,
  NEP (1 kHz) $9\times10^{-14}$ w/Hz$^{\frac{1}{2}}$
  Frequency response: 35 MHz The reducing optics 24 can, for example, be a negative f/0.5 lens and a f/6.4 positive lens, both 2 cm in diameter and set 11.8 cm apart, or a standard microscope objective with a 0.85 N.A. followed by a 5 cm focal length collimating lens. The latter corresponds to a 116° included angle and gives a FOV somewhat larger than 90° at the expense of a smaller input aperture. The former example has about a 110:1 reduction in its effective aperture area, so its collection efficiency is approximately a factor of 4 larger than the latter.

The selection criteria for Savart plate parameters is given by equation (5). Since $\theta_R\sin(\max) = R\sin\theta_H(\max)$ and in view of equation (4) it is apparent that all the parameters (R, d, $\lambda$, $\beta$, $\Delta n$, $n_o$) other than $\theta_H(\max)$ are selectable and not uniquely fixed. This allows the wavelength of the sensor to be chosen to fit the laser beam. The FOV reduction factor R can be selected to give a practical and optically feasible lens system (such as the microscope objective). The crystal material is selectable. For example, quartz has other desirable properties such as availability, uniformity, hardness, low absorption, etc., which other optical materials might not have. Thickness versus cut angle offers a trade off in order to ease any manufacturing difficulty of a Savart plate.

This allows flexibility in meeting the FOV versus half-cycle of plane constraint, and allows freedom in selection of parameters so that the sensor has all the other desirable features such as the right wavelength, a big FOV, and readily available and easily manufactured optical components.

The particular half-cycle of the phase shift which is used is determined by the bias tilt angle given to the Savart plate, and it is important to keep this tilt as small as possible in order to avoid the third order abberations mentioned by Peek. A typical bias tilt angle is 2° or 3°. Thus the half cycle to be used is the first one, as shown in FIG. 6, and corresponds to the smallest required bias tilt angle.

Figure 5:
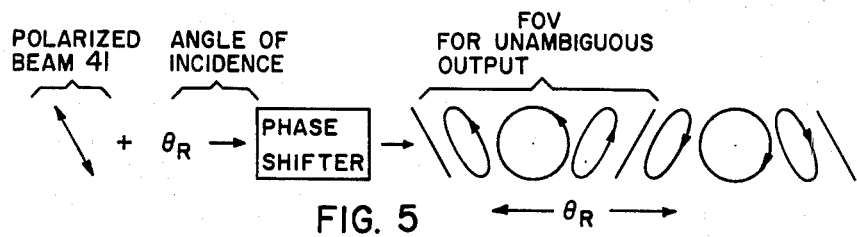
FIG. 5 is a qualitative schematic of the induced ellipticity of the output wave.

FIG. 5 discloses a qualitative schematic of the induced ellipticity of the output beam 41 from the Savart plate 32. The polarized beam at the angle of incidence $\theta_R$ to the Savart plate produces an output beam whose ellipticity varies across the field of view, as shown in FIG. 5. The same effect occurs for Savart plate 36. Thus by orienting the Wollaston prisms 34 and 38 to analyze the ±45° components (parallel and normal to the original ±45° polarizer) respectively, the detector array outputs will vary as shown in FIG. 6 and the field of view is limited by the parameters to the FOV shown in FIG. 6.

The resolution of a sensor is essentially equal to the signal-to-noise ratio of the output. In locating remote lasers, the on-axis signal is relatively large. For proper operation with a single filter 28 there can be only one bright source having that wavelength in the FOV at a time, since the entire FOV is always incident on the detectors.

For the UDT PIN-Spot 4D detector and a 1 mW HeNe laser input beam, the signal to noise ratio (SNR) is on the order of $$S/N = \frac{(10^{-3}W) \times (5 \times 10^{-3}) \times (\frac{1}{4} \times \frac{1}{4})}{4 \times (9 \times 10^{-14} W/Hz^{\frac{1}{2}}) \times (10^3 Hz)^{\frac{1}{2}}} = 0.38 \times 10^5 \quad (6)$$

Where $(5 \times 10^{-3})$ is the reducing optics attenuation and $(\frac{1}{4} \times \frac{1}{4})$ is the effect of the various polarizers on the signal. Since the system is required to resolve one part in nine hundred, the system will provide at least this amount even under adverse conditions.

Thus by using signal processing circuitry 20 to apply equation (2) to the outputs 1, 2, 3 and 4 on detector array 54 one obtains the ratios:

$$I_V = \frac{(I_1 + I_3) - (I_2 + I_4)}{I_1 + I_2 + I_3 + I_4}, \text{ and} \quad (7)$$

$$I_H = \frac{(I_1 + I_2) - (I_3 + I_4)}{I_1 + I_2 + I_3 + I_4}, \quad (8)$$

where $I_n = I_v$ for determining the vertical component and $I_n = I_H$ for determining the horizontal component of the direction or designated look-angle from which the laser beam is coming.

The laser locator system provides a reduced number of components for a two-axis system, with only one set of reducing optics and linear polarizer needed on the front end. It yields an extremely compact in-line device package. The two sensitive axes can be oriented during fabrication and are thus insensitive to future misalignment due to stress and handling in use.

Figure 8:
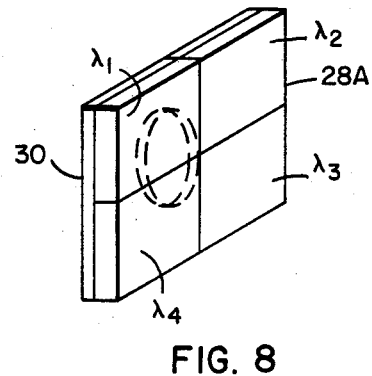
FIG. 8 is a quad-filter arrangement overlapping the aperture for allowing multiple laser wavelength detection.

FIG. 8 discloses a multiple filter arrangement which allows more than 1 laser source to be located. In this typical arrangement, the single filter 28 of wavelength λ is replaced with a multiple filter assembly 28A wherein four individual filters having wavelengths $\lambda_1, \lambda_2, \lambda_3$, and $\lambda_4$ are brought together in a quadrant configuration. The center or "O" point of the quadrant is centered along axis 14, being centered over the aperture of aperture plate 30 so that all four wavelengths may be passed simultaneously through the aperture. Thus, where laser sources of differing wavelengths are transmitting toward the laser locator, they can be detected when the proper wavelength filter is employed. Similarly, a family of filter assemblies 28A covering selected laser frequencies may be interchangeably used if desired.

Figure 9:
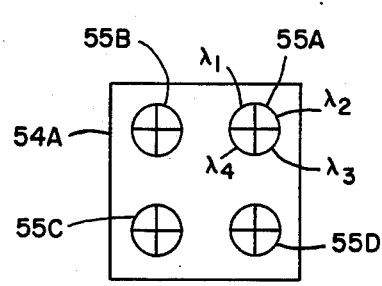
FIG. 9 is a typical quadrant detector arrangement for the detectors of FIGS. 2 and 3.

Fo the multiple filter assembly or family the detector operation would be similar to that shown, but would differ in processing. Typically, for use with assembly 28A, quadrant detectors may be used as shown in FIG. 9. The aperture of aperture plate 30 is imaged by lens 40. By locating the detector array 54A an adjustable distance from lens 40 each quadrant of assembly 28A can have its intensity impinging on the corresponding quadrants of all the detectors. Thus as shown in FIG. 9 a detector array is shown wherein four quadrant detector subassemblies 55A, 55B, 55C, and 55D are disposed in a quadrant configuration corresponding to the filter assembly 28A configuration. Each subassembly 55 comprises four detectors to detect the desired wavelengths $\lambda_1, \lambda_2, \lambda_3,$ and $\lambda_4$ respectively. The detector outputs from the respective wavelength $(\lambda_n)$ detected are then processed as shown and discussed with reference to FIGS. 1 and 2. Obviously this can be done with a large array 54 of individually filtered detector $56_n, 57_n, 58_n,$ and $59_n$. It can be done with the arrangement of FIG. 9, or it can be accomplished by periodically and sequentially rotating a multiple filter wheel between lens 40 and a general detector array 54 to select the frequency being processed, and simultaneously multiplexing these signals in signal processing circuit 20 to maintain track of which wavelength is being processed. The more simple mode, however, as shown in FIGS. 8 and 9 does not require multiplexing, requiring merely a duplicate electronic processing such as that of signal processing circuit 20 and the larger detector array 54A.

It is to be understood that the form of the invention, herewith shown and described is to be taken as a preferred example of the same, and that various changes may be resorted to without departing from the spirit and scope of the invention. Accordingly, the scope of the invention is to be limited only by the claims appended hereto.

I claim:

1. A remote laser locator system for processing incoming directional optical energy comprising: an optical sensor disposed for detecting impinging optical energy; said sensor comprising a polarizer, optical wavelength filter means, an internal aperture, first and second phase shifters, first and second polarization analyzers, an aperture reimaging lens system for imaging said internal aperture, and a detector array; said sensor being disposed for directing impinging optical energy sequentially through said polarizer, filter, internal aperture, first phase shifter, first analyzer, second phase shifter, second analyzer and lens system to said detector array; and the outputs of said detector array being electrical outputs defining the angle of incidence of said optical energy.

2. A remote laser locator system as set forth in claim 1 wherein said optical sensor further comprises optic means disposed adjacent to said polarizer for receiving incoming optical energy, compressing the field of view, and directing the optical energy to said polarizer.

3. A remote laser sensor system as set forth in claim 2 wherein said phase shifters comprise a modified Savart plate, and said polarization analyzers are Wollaston prisms and further comprising signal processing means for selectively combining said detector array electrical outputs and indicating the angle of incidence of said optical energy.

4. A remote laser locator system as set forth in claim 3 wherein said polarizer is a segmented aperture polarizer for assuring correct polarization of optical energy passing therethrough regardless of the polarization state of the input beam.

5. A remote laser locator system as set forth in claim 2 wherein each of said phase shifters is a Savart plate comprising first and second birefringent quartz crystal plates, each cut with an optical axis at a predetermined acute angle to the surface of the crystal, said plates being arranged in parallel, said second plate being rotated 180 degrees from the first, and a half-wave plate sandwiched between the two crystal plates and fixably attached thereto.

6. A remote laser locator system as set forth in claim 5 wherein said polarizer is a segmented polarizer, and said optic means is a microscope objective in series with a collimating lens and disposed as compressing optics to provide a 10 to 1 reduction, said objective and said collimating lens providing a 90 degree field of view.

7. A remote laser locator system as set forth in claim 6 wherein said filter means is a spectral line filter.

8. A remote laser locator system as set forth in claim 6 wherein said filter means is a spectral line filter array comprising at least four line filters arranged in a quadrant array and disposed for simultaneously passing impinging optical energy through said aperture.

9. In a remote laser locator system for processing incoming directional optical energy and having an optical sensing system for providing a wide field-of-view and a signal processing system for receiving and processing the optical energy for indicating the location or direction from which said energy is impinging, the improvement of the optical sensing system comprising and being disposed for passing impinging optical energy sequentially therethrough: a polarizer, an optical filter means, an internal aperture, a first phase shifter, a first polarization analyzer, a second phase shifter, a second polarization analyzer, and an aperture reimager lens, and a detector array disposed for receiving impinging optical energy from said lens and for providing an electrical signal output to said signal processing system.

10. A laser locator system as set forth in claim 9 wherein said optical filter means is a spectral line filter array comprising at least four line filters arranged in a quadrant array and disposed for simultaneously passing impinging optical energy through said aperture and wherein said phase shifters are modified Savart plates.

11. A laser locator system as set forth in claim 10 wherein said polarization analyzers are Wollaston prisms and said detector array comprises at least four optical detectors.

12. A laser locator system as set forth in claim 11 and further comprising optic means disposed adjacent to said polarizer for receiving incoming optical energy, compressing the field-of-view, and directing the optical energy to said polarizer, said optic means providing a 90° field of view to a positional accuracy of less than 0.1 degree.

* * * * *